United States Patent [19]

Adams

[11] 4,261,555

[45] Apr. 14, 1981

[54] OPTICAL VISE

[76] Inventor: Thomas J. Adams, 314 Cochran Dr., Mather A.F.B., Calif. 95655

[21] Appl. No.: 47,772

[22] Filed: Jun. 12, 1979

[51] Int. Cl.$^{3}$ ............................................. B23Q 3/00

[52] U.S. Cl. ..................................... 269/11; 269/16; 269/60; 269/71; 269/82; 269/254 R; 269/274

[58] Field of Search ....................... 269/45, 71, 73, 11, 269/16, 60, 82, 74, 254 R, 274, 269 W

[56] References Cited

U.S. PATENT DOCUMENTS

| | | | |
|---|---|---|---|
| 456,891 | 7/1891 | Fish | 269/71 |
| 1,013,711 | 1/1912 | Wiggins | 269/71 |
| 2,177,222 | 10/1939 | Murphy | 269/16 |
| 2,221,108 | 11/1940 | Rathbun | 269/71 |
| 2,258,686 | 10/1941 | Olney | 269/274 |
| 3,069,935 | 12/1962 | Garvin | 269/60 |
| 3,106,111 | 10/1963 | Denisco | 269/71 |
| 4,167,264 | 9/1979 | Kretzmeir | 269/16 |

*Primary Examiner*—Robert C. Watson
*Attorney, Agent, or Firm*—Blair, Brown & Kreten

[57] ABSTRACT

Disclosed herein is an optical vise used to securely fasten glasses thereto for performing maintenance functions, suitably constructed so that the glasses retained therein will not be marred or otherwise damaged while being repaired. The structure disclosed herein includes a pedestal providing a support for horizontally extending trays that serve to carry tools and parts, a vertically adjustable support structure which carries at its vertical extremity remote from the base and vise proper. The vise is capable of rotation about a horizontal axis and defines a nesting area for securing foam or a similar soft resilient rubber material which serves to constrain the eye glasses disposed in a slit between two such pads. A back portion of the vise is provided with a similarly spongy material provided with slits along one face thereof so that the arcuate portion of the glasses which when in use hook around the ears of the wearer slide within these slits to provide further support. A rearwardly disposed support carries a light thereon to supplement the existing light in the area and the entire structure when assembled can translate laterally from back to forward for additional convenience in use.

7 Claims, 6 Drawing Figures

OPTICAL VISE

BACKGROUND OF THE INVENTION

The concept of using a vise as a work holder has frequently been found to be a great convenience to facilitate work on articles. It should be clear however that the more conveniently a vise can accommodate the person utilizing same, the greater the efficiency that will be obtained.

The prior art contains several work holding devices, and the following references are seen to be illustrative: U.S. Pat. Nos.

| | |
|---|---|
| 3,108,504 | Eichinger |
| 3,599,961 | Morgan |
| 3,710,653 | Miller |
| 3,837,633 | Paulsen |

Clearly, each of the teachings in these references is directed to a highly specialized work holder engineered to provide benefits that closely parallel the peculiarities associated with the object being worked on. For example, Eichinger provides a jig for modifying spectacle frames, his structure is markedly dissimilar from that which is provided in the instant application, and therefore the benefits associated with the specific structure disclosed herein do not accrue by using his device. The remaining references, while being of interest since various structural details such as a soft type of jaw clamp has been provided, none singly nor in concert contemplate the structure, flexability, and benefits associated with the device of the instant application.

SUMMARY AND OBJECTS OF THE INVENTION

Accordingly, the ensuing detailed description provides an optical vise which is vertically adjustable, horizontally adjustable and capable of rotation around a horizontal axis for ease in working on spectacles carried thereon.

Further, it is an object of this invention to provide a vise of the character described above which while securely fastening glasses thereto will not mar or damage the glasses while being worked on.

A further object contemplates providing a vise of the character described above which is portable. Further, the base of the vise is weighted so as to provide additional stability, and the work trays associated therewith provide a convenient area for holding tools, parts and the like.

An additional object is to provide a top plate upon which a portion of the glasses rest with a suspension system which allows the degree to which the glasses will be constrained between deformable portions of the vise by merely allowing pressure to vary.

These and other objects will be made manifest when considering the following detailed specification as they relate to the drawing figures.

BRIEF DESCRIPTION OF THE PREFERRED EMBODIMENT

Figure 1:
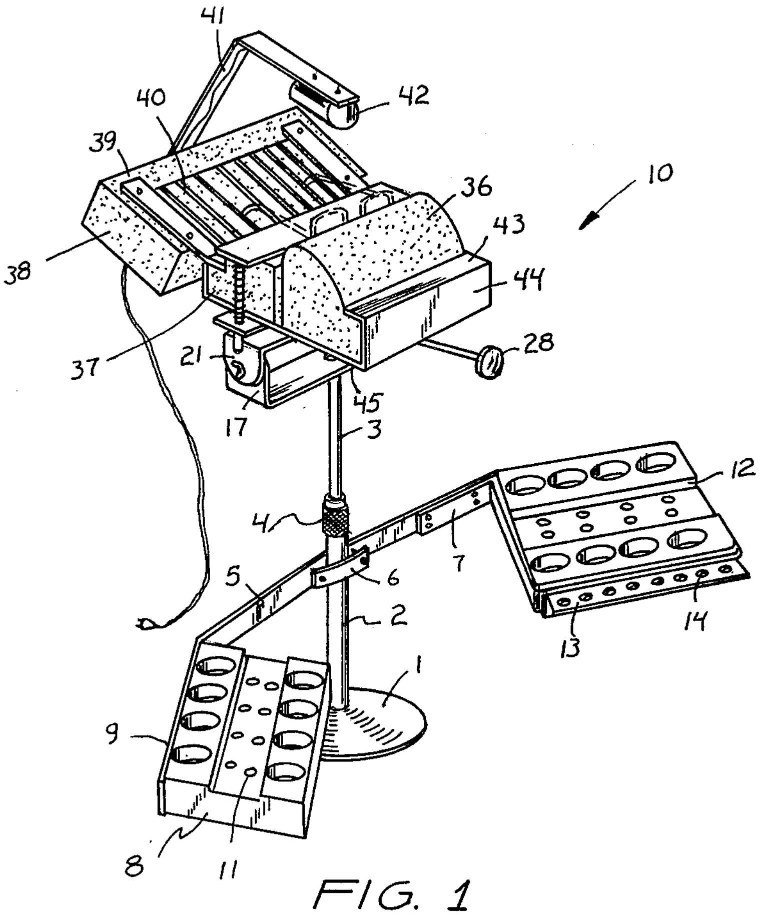
FIG. 1 is a perspective view of the vise according to the present invention.

Referring to the drawings now, wherein like reference numerals refer to like parts throughout the several drawings, reference numeral 10 is directed to the vise according to the present invention.

As seen in FIG. 1, the vise 10 is formed having a base 1 which is preferably weighted for additional stability, and a centrally disposed upstanding shaft 2 is provided thereon. Telescoping within the shaft 2 is a further shaft 3, and the height of these two relative rods can be adjusted through knurled adjusting member 4 so that the height of the vise can be varied. Extending outwardly from the support shaft is a rod made of flat metal 5 fastened on to the shaft 2 by means of clamp 6. These outstanding arms 5 serve to support trays at opposed extremities thereof, and these trays 8 have suitable openings and holes on the top faces thereof to conveniently carry tools and parts as may be required. Specifically, each tray is seen to be of substantially rectangular configuration having two rows provided with large cups 9 on the top faces thereof and a center strip portion depressed downwardly relative to the horizontal plane defined by these two rows having smaller holes 11 therein. The right side carries a tray which has a rack 13 disposed on the front edge thereof provided with further holes 14 to allow tools to be carried thereon.

Figure 6:
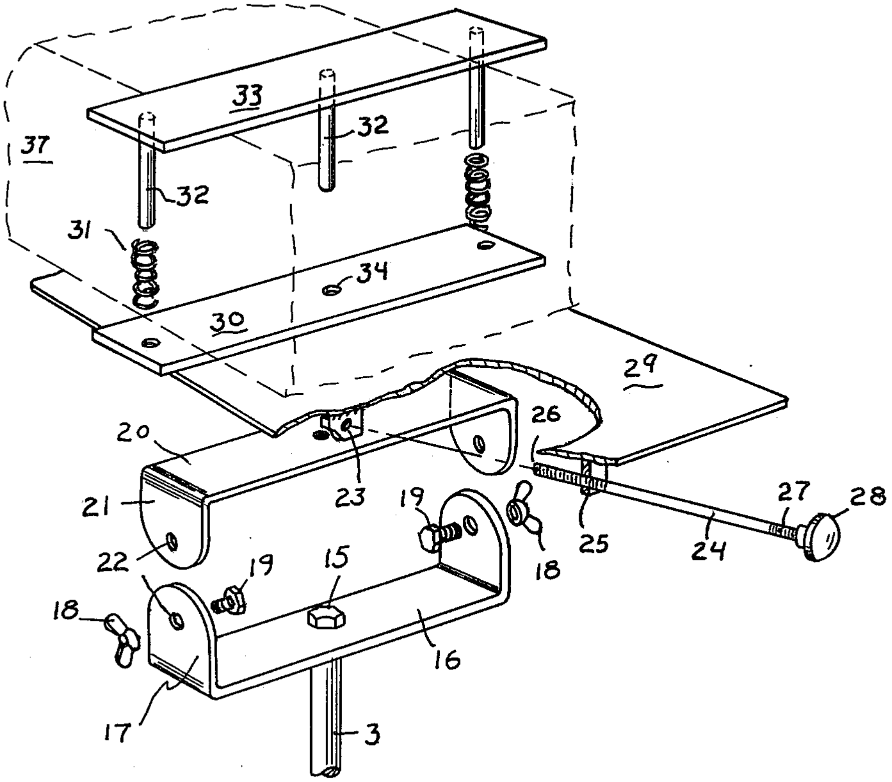
FIG. 6 provides a parts blow up of the vise structure and its adjustable components for lateral and rotational translation of the vise relative to the pedestal.

FIG. 6 best shows the adjustable nature of the vise portion disposed at the top of shaft 3 and the components will now be defined. The shaft 3 serves as a support connection for U-shaped bracket 16 having vertically upstanding ears 17 at opposed extremities thereof. The bracket 16 is fastened to the shaft 3 by means of a screw 15. Holes are disposed on both ears 17, these holes bearing the legend 22 and these holes are meant to align with a bracket similar to 16 having an inverted configuration relative thereto. This second bracket 20 extends downwardly with its ears 21 and the holes 22 registering with the lower bracket so that a screw 19 and wingnut 18 can fasten the two brackets together. With this type of configuration, the upper bracket can rotate relative to the lower bracket by adjusting these wingnuts. The upper bracket 20 serves to support the vise proper, and to this end a nut 23 is welded thereon. Further, the nut 23 is welded to a support plate 49, best seen in FIG. 2. This support plate 49 has a flat top surface which can allow plate 29 to rest securely thereon. The right hand extremity of the plate 29 has extending downwardly a threaded bore 25 through which a rod 24 is threadedly affixed. The rod 24 has threads 26 and 27 disposed at both extremities thereof, and the terminal portion proximate to threaded end 27 has a knob 28 to facilitate rotation of the shaft. Clearly therefore, the upper plate 29 will slide laterally from left to right as shown in FIG. 2 based upon the manner in which the knob is rotated to translate the plate 29 relative to the inverted U-shaped bracket 20.

Overlying and affixed to the plate 29 is a clamp member having an upright U-shaped configuration with vertical walls 44 which terminate with a horizontally inwardly directed flange 43 as best shown in FIG. 1. The flange 43 along with walls 44 and the bottom plate 45 serve to carry and support two foam wedges 36 and 37. As shown in the drawings, the sponge wedge 36 has a greater vertical extent than member 37, and its bottom portion is formed to complement the contour of the support 43 44. The area of abutment between these two sponge members 36 and 37 is substantially planar, but of course can be deformed. The sponge member 37 conforms to the rear portion of the holding area 33 34 so that when glasses are laid thereon as shown in FIG. 1, the portion of the glasses that contain the lenses can nest between these two sponge wedges and be constrained therebetween. Overlying the sponge 37 is a plate member 33 which has depending therefrom a plurality of rods 32, and FIG. 6 indicates that these rods are biased relative to plate 30 as with springs. The rods 32 are oriented to align and extend within the holes 34 on plate 30, and the sponge 37 is effectively sandwiched therebetween.

Figure 4:
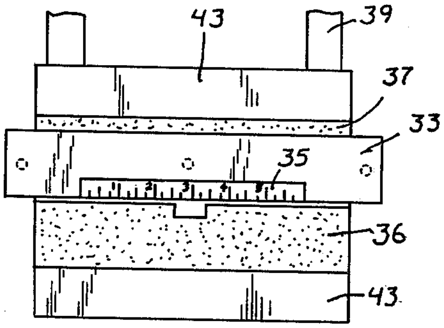
FIG. 4 is a detailed view of a portion of the vise, the top face thereof.
Figure 5:
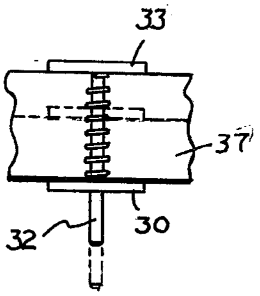
FIG. 5 is a side view cut-away showing the adjustable nature of the top plate and its suspension system.

FIG. 4 shows an embodiment in which the upper plate 33 is provided with a scale along one edge thereof, and the scale 35 can be used to measure various dimensions associated with the glasses. FIG. 5 is a partial view of the top and bottom plates, the downwardly extending pins 32 and the spring elements, and it is to be noted that the sponge material 37 is selected from a group of materials which when compressed by pressure from plate 33 will tend to keep the sponge material in a depressed state.

Figure 2:
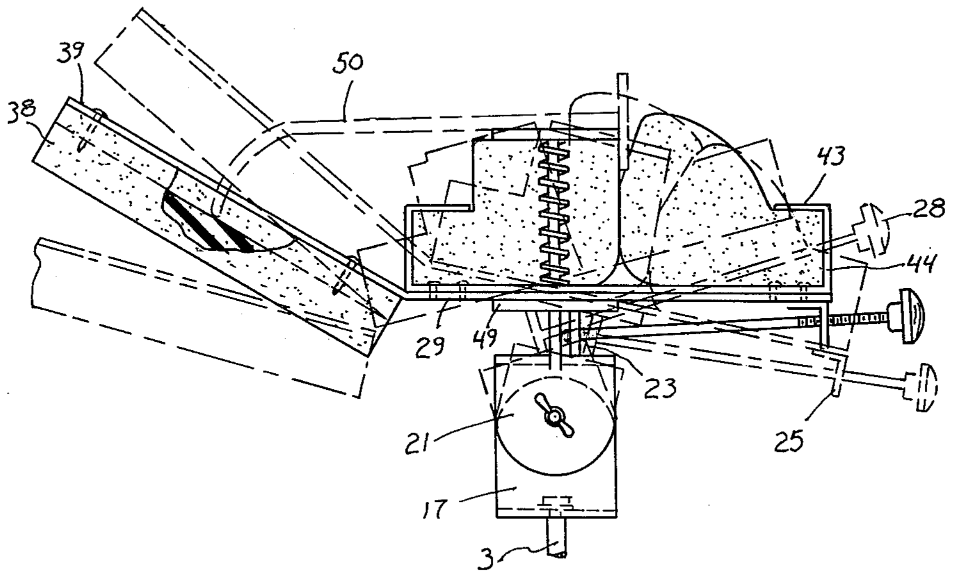
FIG. 2 is a side view of the top portion of the vise showing adjustable features.
Figure 3:
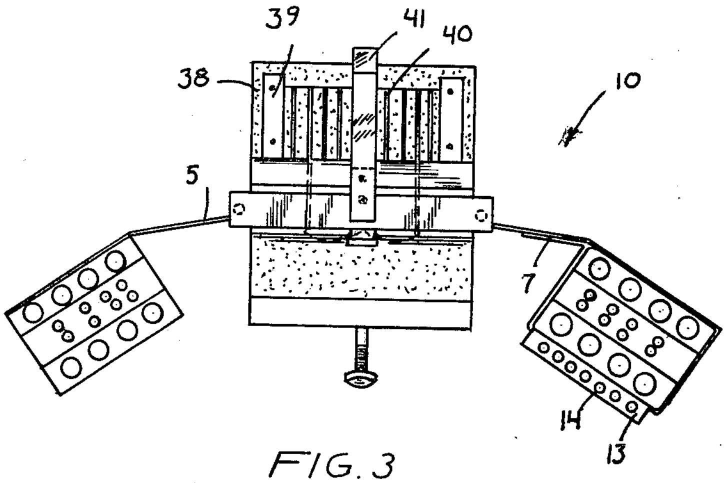
FIG. 3 is a top plan view of the vise according to the present invention.

Further support for the glasses takes the form of a wing which extends along the back of the vise and is fastened to the lower portion of the clamp frame work 43 44 as best seen in FIG. 2. The further support is defined by a pair of opposed spaced angle braces 39 from which depend a third foam block 38, and this foam block is made of a composite material that is provided with a plurality of parallel slits which are extending in the same direction as the support bars 39. In use and operation, the glasses have ear piece portions which are curved, and these acruate ends extend within the slits 40 for further retention.

As shown in FIG. 1, extending upwardly away from the third foam block 38, a light 42 is provided on the support stand 41 which can be moved and oriented in many positions so as to intensify the lighting in the appropriate areas of interest.

Having thus described the invention, it should be apparent that numerous structural modifications are contemplated as being a part of this invention as specified hereinbefore and as detailed hereinbelow by the claims.

What is claimed is:

1. An optical vise used for holding eye glasses for work thereon comprising a support base, resilient vise means connected to said base, and plural adjustment means for orienting said resilient vise means relative to said base, said adjustment means comprises first and second shafts telescopically interconnected provided with a clamp to adjust and maintain the relative lengths of the two shafts, said adjustment means further includes an upwardly directed U-shaped bracket having ears at the extremities thereof facing one another and means defining openings therethrough, a second U-shaped bracket inverted relative to said first bracket extending downwardly thereover in which the ears of said second bracket overlies the ears of said first bracket and means defining opening provided on said ears to register with the opening of said first bracket, and screw means extending through said openings when placed in registry whereby said upper brackets support said resilient vise and loosening of these screws allows the upper bracket to rotate relative to the lower bracket along a horizontal axis, said upper bracket has on a top face thereof a nut firmly affixed thereof, said nut serves to support an overlying plate, said overlying plate has placed thereon a frame means for containing said resilient vise, said frame means having a threaded bore along one edge thereof, and adjustable screw means extending between said nut and said threaded bore whereby adjustment thereof provides translation of said frame means relative to said brackets.

2. The device of claim 1 wherein said resilient vise comprises forward and rearward portions and glasses are constrained therebetween, and said rearward portion has on its top face thereof a plate provided with a plurality of depending posts which extend through said resilient vise, said depending post having spring means thereon which coact with said lower flat plate.

3. The device of claim 2 wherein a third resilient vise is provided extending along the back face of said first and second resilient portions, said third vise being provided with a plurality of slits on a top face thereon which encounter and constrain an arcuate portion of the glasses which are remote from the glass lenses.

4. The device of claim 3 in which said third vise is connected to said frame by means of a pair of spaced parallel planar rod members.

5. The device of claim 4 in which illumination means are provided on said optical vise.

6. The device of claim 5 in which a plurality of tray elements are connected to one of said shafts so as to serve as a support container for tools and similar objects.

7. The device of claim 6 in which said trays are connected to said shaft by means of a arm member fastened to said shaft by means of a clamp, and said trays define substantially rectangular containers having a plurality of cups on the top face thereof, and further wherein one of said trays is provided with an outwardly extending flange having holes thereon to allow tools to be inserted therethrough for storage.

* * * * *